United States Patent Office 3,311,590
Patented Mar. 28, 1967

3,311,590
EPOXY RESIN HAVING HIGH DIELECTRIC LOSS FACTOR
Christian A. Weber, Dale D. Rogers, and Paul C. Woodland, Midland, Mich., assignors to The Dow Chemical Company, Midland, Mich., a corporation of Delaware
No Drawing. Filed Sept. 20, 1963, Ser. No. 310,453
8 Claims. (Cl. 260—47)

This invention relates to an epoxy resin having a high dielectric loss factor whereby dielectric means may be used to harden and cure the resin. More specifically the invention concerns an epoxy resin in combination with hardening agents which produce a thermosettable mixture having a high loss factor and which cures to a tough resin particularly suitable for construction purposes.

Adhesives for construction materials such as wooden panels, beams, and the like desirably should have a number of properties which make them durable under various environments. They should be resistant to moisture so that high humidity does not weaken or deteriorate the bond and they should have high strength with a modulus of elasticity which provides a strong joint having sufficient flexibility that it does not fail when subjected to the dimensional changes produced by variations in temperature and humidity. Epoxy resins can be prepared to obtain these properties by blending the flexible resins with those which normally produce hard, brittle resins and subjecting the blend to a thermal cure in the presence of amine hardening agents. Unfortunately the joints to be bonded are not always exposed so that heat can be applied to produce the cure. In those instances, it usually is necessary to employ a resin system having a rapid cure at ambient temperature. This has the disadvantage that the resin must be mixed frequently in small batches or else kept refrigerated until used.

Dielectric heating has been used in some instances to cure thermo-setting resins where the resin is not accessible to the direct application of heat. In plywood manufacture, for example, the phenolic resin used to laminate the sheets of wood is cured by dielectric heating, thereby avoiding the slow rate of heat transfer through the wood. Unfortunately the epoxy resins heretofore available could not be cured by dielectric means. On the contrary, their dielectric properties are so low that they make excellent potting resins for electronic components and are widely used as insulation in electric motors.

We have discovered a thermosettable epoxy resin system which has a high dielectric loss factor whereby dielecric heating may be employed to cure the resin. These resins are tough and flexible and have particular utility as adhesive in the construction industry. In this type of use a quantity of the resin may be mixed with hardeners and kept at a low temperature where the rate of curing is extremely low, thereby prolonging the pot life. As the resin is applied to panels and other members to be boded together, a high frequency electric field may be applied to portions of the resin to produce rapid curing of the resin in that area. This procedure is similar to the so-called tack welding of metal structures in that it affords a rapid means of assembling members. The remainder of the resin may be heated dielectrically after the assembly has been completed or the resin allowed to cure at ambient temperature over an extended period of time. Thus, the resin and method of cure has particular utility as an adhesive for construction operations and particularly in cold weather areas where other means of heating the adhesive to effect the cure are not possible in unsheltered structures.

According to our invention, an epoxy resin having a dielectric loss factor sufficient to permit heating by dielectric means is obtained by combining a diglycidyl ether of a thiobisphenol having from one to two sulfur atoms in the molecule with a hardening agent comprising the polyamine adduct of the diglycidyl ether of a bisphenol. The diglycidyl ether of thiobisphenol may be represented by the following structural formula:

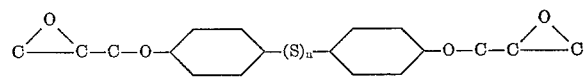

where $n$ is 1 or 2. This compound may be produced by the reaction of epichlorohydrin and the bisphenol obtained in the reaction of phenol with sulfur chloride.

The hardening agent which may be used in curing the resin is an adduct of two molecules of a polyamine with one molecule of a diglycidyl ether and may be represented by the following structural formula:

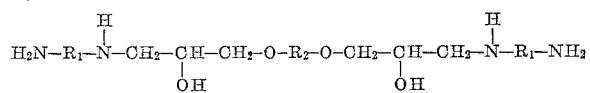

where $R_1$ may be an alkyl group or a second amino group containing from 2 to 6 carbon atoms, and $R_2$ may be an alkyl, aryl, polyalkoxy, or a bisphenol group. Specific polyamines which may be used in preparing these hardening agents include ethylene diamine, diethylene triamine and triethylene tetramine. The ether portion of the adduct may be provided by diglycidyl ether or the diglycidyl ethers of ethylene glycol, propylene glycol, polyethylene glycol, polypropylene glycol, resorcinol, hydroquinone, bisphenol A, (bis(4 - hydroxyphenyl)dimethylmethane), bisphenol F, (bis(4-hydroxyphenyl)methane), 4,4-dihydroxy diphenyl oxide, 4,4-dihydroxy biphenyl, dihydroxyl diphenyl sulfone and thiobisphenol. A mixture of two or more of these hardening agents may be used rather than a single compound. For example, a more flexible resin may be produced by the diamine adduct of the diglycidyl ether of a polyglycol. The polyamine adducts of the diglycidyl ether of bisphenol A generally are preferred over those of other diglycidyl ethers owing to their toughness, i.e., high strength with moderate flexibility.

The flexibility of the cured resin may be increased greatly without a significant sacrifice in dielectric loss factor or other properties such as strength and water absorption, by using a mixed hardening agent having a diamine of polypropylene glycol or similar aliphatic polyhydroxy compound substituted for a part of the polyamine adduct of a diglycidyl ether. Thus, installations which are expected to be subjected to broad seasonal or other periodic variations in temperature, humidity, and the like may be more durable when the hardening agent contains up to 3 molecular equivalents of the diamine of a polyglycol such as polyethylene glycol and polypropylene glycol per molecular equivalent of the polyamine adduct. These diamines are obtained by substituting amine groups for the terminal hydroxy groups of the polyglycol. In general, polyglycols having a molecular weight between about 250 and 400 produce suitable diamines for the hardening agent.

A stoichiometric amount of the hardening agent must be used, i.e., the total amine groups in the hardening agent must be equivalent to the oxirane groups in the thiobisphenol. The sum of the molecular equivalents of polyamine adduct of diglycidyl ether and the diamine of a polyglycol must be equal to the molecular equivalents of the diglycidyl ether of thiobisphenol. The rate at which these resin mixtures may be cured by dielectric heating can be accelerated by adding up to 20 parts of a phenolic compound per hundred parts resin. Phenols are reactive in the epoxy resin system and further increase the dielectric loss factor, thereby increasing the rate at which the resin is heated by a high frequency electrical field without deteriorating the useful properties of the cured resin. Also, reactive diluents such as butyl glycidyl ether may be added to reduce the viscosity of the resin so that it can be applied to the substrates easier. These diluents also increase the flexibility of the cured resin and usually decrease the strength slightly.

The dielectric loss factors of several mixtures of resins prepared in accordance with our invention were determined according to ASTM test method D–150–59T. The loss factor, which is the product of the dielectric constant and the dissipation factor, was determined at a frequency of $10^5$ c.p.s. These loss factors are listed in Table I.

TABLE I

|   | Epoxy Resin | Hardeners | | Phenol | Reactive Diluent BGE [3] | Dielectric Loss Factor |
|---|---|---|---|---|---|---|
|   |   | DETA-DGE adduct [1] | Polyol Diamine [2] |   |   |   |
| A | 68 | 12 | 12 |   | 8 | 0.91 |
| B | 76 | 15 | 7 | 2 |   | 1.07 |
| C | 65 | 12 | 12 | 3 | 8 | 1.45 |
| D | 64 | 11 | 11 | 6 | 8 | 2.11 |

[1] The reaction product of two molecular equivalents of diethylene triamine and one molecular equivalent of the diglycidyl ether of bisphenol A.
[2] The diamine of polypropylene glycol having a molecular weight of approximately 250.
[3] Butyl glycidyl ether.

The epoxy resin used in the samples of Table I was the diglycidyl ether of thiobisphenol. The quantities of the various ingredients of the resin mixtures are parts per hundred parts resin. The loss factors of commercially available epoxy resins are approximately 0.1, thus it can be seen that heat will be developed in the resins of Table I at a rate ten to twenty times that of the present commercial resins since the rate of heating is directly proportional to the loss factor.

In addition to the construction industry, these resins will have particular utility in the manufacture of furniture. Dielectric curing has been used with phenolic resins in furniture joints not amenable to other forms of heat curing. The phenolics generally do not have the degree of flexibility found in the resins of this invention which is necessary to maintain tight joints throughout wide variations in humidity and moisture content of the wood.

Another application for these resins is in the manufacture of building panels wherein sheets of metal or board are bonded to a cellular material such as foamed polystyrene. These resins do not plasticize the polystyrene and destroy its cellular structure. Also, the dielectric heating is less likely to produce localized overheating which might cause some of the foam cells to collapse.

What is claimed is:

1. A thermosettable epoxy resin characterized by a high dielectric loss factor comprising an equimolecular mixture of a diglycidyl ether of thiobisphenol and a hardening agent comprising the adduct of an aliphatic polyamine and a diglycidyl ether.

2. A resin according to claim 1 wherein said hardening agent comprises a mixture of said adduct of an aliphatic polyamine and a diglycidyl ether together with the diamine of a polyglycol, the molecular ratio of said adduct to said polyglycol diamine being from about 4:0 to about 1:3.

3. A resin according to claim 2 wherein said hardening agent comprises the adduct of diethylene triamine with the diglycidyl ether of bis(4-hydroxyphenyl)dimethylmethane and the diamine of a polypropylene glycol having a molecular weight between about 250 and 400.

4. A resin according to claim 1 wherein said resin contains up to about 20 parts of a phenolic compound per hundred parts of resin as an accelerator for said hardening agent.

5. A thermosettable epoxy resin comprising an equimolecular mixture of the diglycidyl ether of thiobisphenol and a hardening agent comprising the adduct of diethylene triamine and the diglycidyl ether of bis(4-hydroxyphenyl) dimethylmethane.

6. A resin according to claim 5 wherein said hardening agent contains up to about 20 parts of phenol per hundred parts of resin.

7. A thermosettable epoxy resin comprising a mixture containing about 60–75 parts by weight of the diglycidyl ether of thiobisphenol, about 10–15 parts of the adduct of diethylene triamine and the diglycidyl ether of bis(4-hydroxyphenyl)dimethylmethane, about 10–15 parts of the diamine of a polypropylene glycol having a molecular weight of about 250, and about 2–8 parts of phenol.

8. A low viscosity thermosettable epoxy resin comprising a mixture containing about 64 parts by weight of the diglycidyl ether of thiobisphenol, 11 parts of the adduct of diethylene triamine and the diglycidyl ether of bis(4-hydroxyphenyl)dimethylmethane, 11 parts of the diamine of polypropylene glycol having a molecular weight of about 250, 6 parts of phenol and 8 parts of butyl glycidyl ether.

References Cited by the Examiner

UNITED STATES PATENTS

| 2,139,766 | 12/1938 | Mikesha | 87—9 |
| 2,723,241 | 11/1955 | De Groote | 260—47 |
| 2,906,723 | 9/1959 | Reese | 260—47 |
| 2,909,448 | 10/1959 | Schroeder | 260—47 |
| 3,023,101 | 2/1962 | Ossenbrumer | 260—47 |

OTHER REFERENCES

Lee et al.: Epoxy Resins, p. 44, McGraw-Hill Book Company, New York, 1957.

WILLIAM H. SHORT, *Primary Examiner.*

J. C. MARTIN, *Assistant Examiner.*